United States Patent [19]

Kanayama

[11] Patent Number: 4,510,409

[45] Date of Patent: Apr. 9, 1985

[54] HEAT INSULATION AND HEAT DISSIPATION CONSTRUCTION FOR FLAT ELECTRIC ROTARY MACHINE

[75] Inventor: Kenji Kanayama, Kariya, Japan

[73] Assignee: Nippondenso Co., Ltd., Kariya, Japan

[21] Appl. No.: 522,737

[22] Filed: Aug. 12, 1983

[30] Foreign Application Priority Data

Sep. 28, 1982 [JP] Japan ................................ 57-169220
Oct. 6, 1982 [JP] Japan ................................ 57-174648
Jan. 21, 1983 [JP] Japan ................................ 58-8245

[51] Int. Cl.³ .......................... H02K 1/32; H02K 9/06
[52] U.S. Cl. ................................ 310/268; 310/60 R; 310/62; 310/67 R
[58] Field of Search ............... 310/60 R, 60 A, 61, 310/268, 152, 156, DIG. 6, 67, 266, 83, 62-65, 67 R, 205-208

[56] References Cited

U.S. PATENT DOCUMENTS

| | | | |
|---|---|---|---|
| 3,091,715 | 5/1963 | Henry-Baudot | 310/268 |
| 3,450,909 | 6/1969 | Burr | 310/58 |
| 4,451,749 | 5/1984 | Kanayama et al. | 310/268 |

FOREIGN PATENT DOCUMENTS

| | | | |
|---|---|---|---|
| 364832 | 10/1962 | France | 310/DIG. 6 |
| 364042 | 10/1962 | France | 310/DIG. 6 |

Primary Examiner—William H. Beha, Jr.
Assistant Examiner—D. L. Rebsch
Attorney, Agent, or Firm—Cushman, Darby & Cushman

[57] ABSTRACT

An electric rotary machine including a stationary armature coil, and a rotor for generating a rotary magnetic field, wherein the armature coil is formed with slits arranged radially and each located between segments of the coil which are arranged radially, and the armature coil is supported with radial gaps at outer and inner peripheral edges of the armature coil, so that thermal strain in the coil can be released through the slits, gaps, and a resilient insulator, and thermal stresses can be prevented from developing. By utilizing the rotation of the rotor, air is introduced from outside to a central portion of the armature coil, from which it is allowed to flow radially outwardly along the armature coil, to thereby suppress a rise in the temperature of the armature coil.

4 Claims, 16 Drawing Figures

HEAT INSULATION AND HEAT DISSIPATION CONSTRUCTION FOR FLAT ELECTRIC ROTARY MACHINE

BACKGROUND OF THE INVENTION

This invention relates to flat electric rotary machines, and more particularly to a heat resisting and heat transferring construction for a flat electric rotary machine designed to provide a compact size relative to its capacity.

In flat electric rotary machines of compact size and high power, a rise in the temperature of armature coils has hitherto raised serious problems. More specifically, an armature coil located in a narrow space generates a large amount of heat because of its high power and its tendency to raise temperature. As a result, high thermal stresses develop in a flat electric rotary machine due to great temperature differences in various sections of the electric rotary machine and differences in thermal expansion coefficient between various materials used in the electric rotary machine. This has hitherto caused mechanical deformation or damage to the armature coil and other parts of the flat electric rotary machine.

SUMMARY OF THE INVENTION

This invention has as its object the provision of a heat resisting and heat transferring construction for a flat electric rotary machine capable of obviating the aforesaid problems with regard to a rise in the temperature of the armature coil of the flat electric rotary machine.

The invention proposes to solve the problems by approaching to them through two different means: one is suppression of a rise in the temperature of the armature coil through air cooling relying on forced circulation of air, and the other is release of thermal strain in the armature coil to avoid a buildup of thermal stresses of high magnitude.

The invention provides, as concrete means for dissipating heat, a multiplicity of slits arranged radially and each interposed between a multiplicity of flat armature coil segments arranged radially, a plurality of gaps defined between inner and outer peripheral edges of the armature coil and annular armature coil fixing members respectively when the armature coil is secured at its inner and outer peripheral edges to the annular armature coil fixing members so that the gaps are located at the radially opposite ends of the armature coil, and a plurality of resilient members interposed between the inner and outer peripheral edges of the armature coil and the annular armature coil fixing members respectively for supporting the armature coil. The invention also provides, as concrete means for transferring heat, a plurality of air intake scoops located on an outer surface of at least one rotor disc for catching air to effect cooling of the electric rotary machine by relying on forced circulation of air, a plurality of air intake apertures penetrating the rotor disc, a plurality of air outlet apertures penetrating the rotor disc, and a plurality of grooves arranged radially and each located between a plurality of magnets arranged on a surface of the rotor disc in face-to-face relation to the armature coil so that the air caught by the air intake scoops by utilizing the rotation of a rotor is passed through the air inlet apertures and led as cooling air currents to the vicinity of the inner peripheral edge of the armature coil, led in a radial direction through the grooves arranged radially between the magnets and released through the air outlet apertures from the rotor. Additionally heat radiating fins are provided to the inner peripheral edge of the armature coil, to thereby increase the area of the armature coil which is brought into contact with the cooling air currents.

DESCRIPTION OF THE PREFERRED EMBODIMENT

One embodiment of the invention will now be described as being incorporated in a generator of an automotive vehicle by referring to the accompanying drawings.

Figure 1:
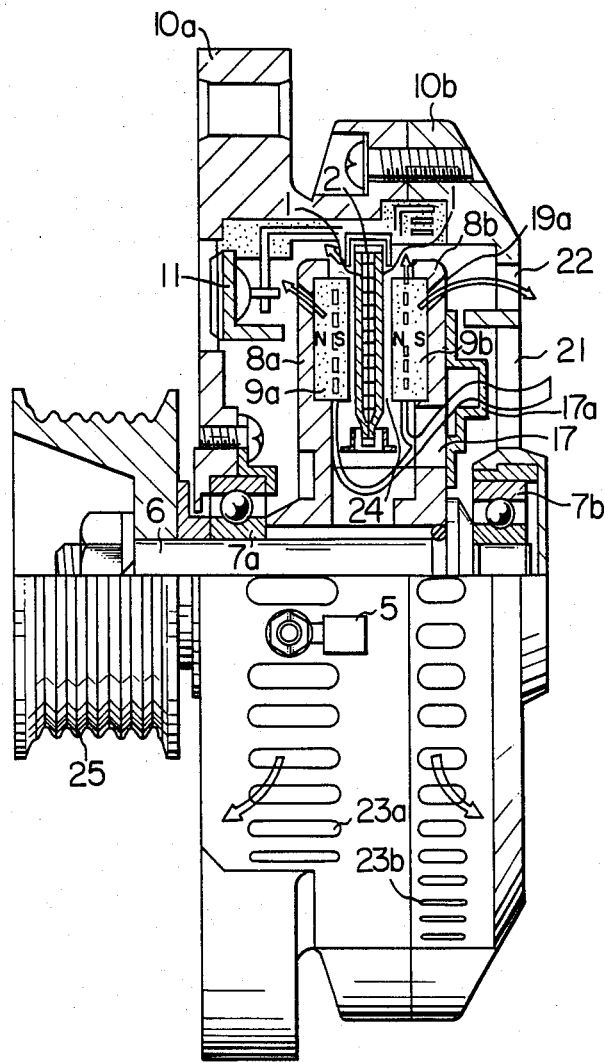
FIG. 1 is a side view, with certain parts being shown in section, of the flat electric rotary machine according to the invention.
Figure 2:
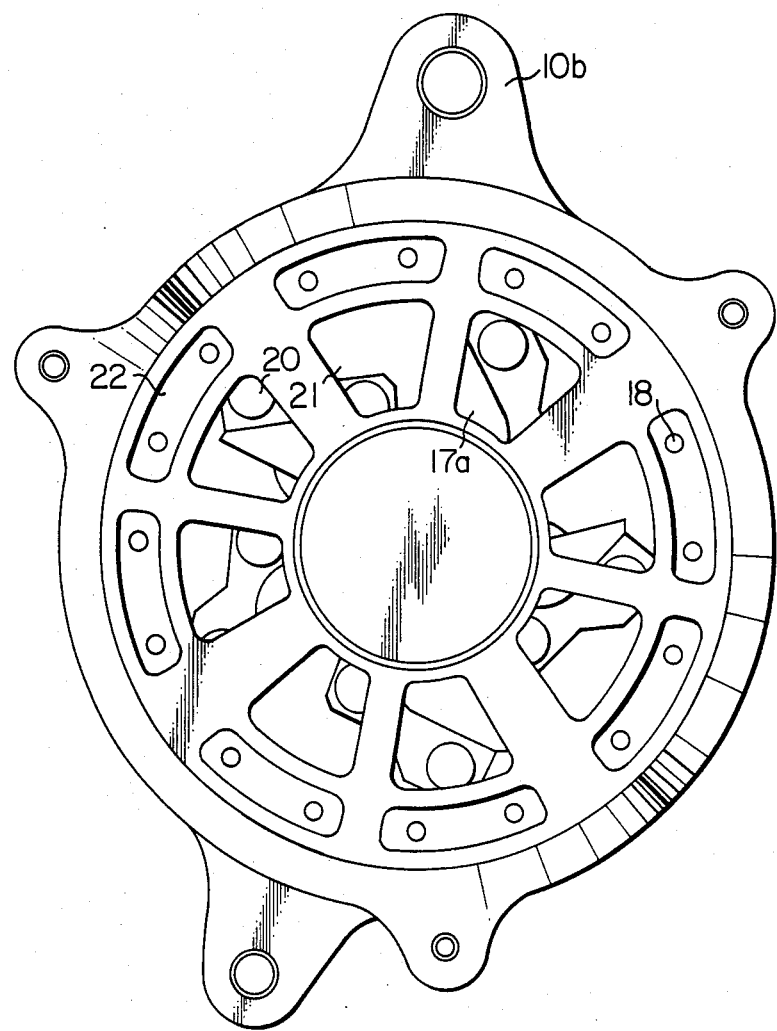
FIG. 2 is a rear view of the electric rotary machine shown in FIG. 1.

Referring to FIGS. 1 and 2, an armature coil comprising a conductive section 1 and an insulating plate 2 of discoidal form is fixed in a housing composed of housing members 10a and 10b and supporting a rotary shaft 6 for rotation through bearings 7a and 7b. The rotary shaft 6 driven through a pulley 25 supports thereon a rotor having two discs 8a and 8b located on opposite sides of the armature coil in spaced juxtaposed relation. Each of the rotor discs 8a and 8b has magnets 9a and 9b of opposite polarities alternately arranged peripherally of their surfaces, so that as the rotor discs 8a and 8b rotate, an electric current is generated in the armature coil and converted to a DC current of a predetermined voltage by a thyristor bridge 11 before being released to outside through a connector 5. Air suction apertures 21 and air exhaust apertures 22 are formed at a rear surface of the housing member 10b and air exhaust apertures 23a and 23b are formed at lateral surfaces of the housing members 10a and 10b.

Figure 3:
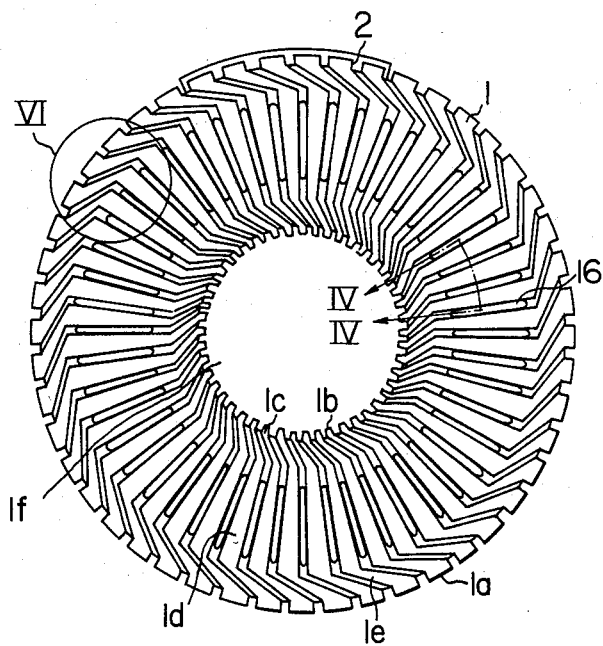
FIG. 3 is a front view of the flat armature coil body of the flat electric rotary machine according to the invention.
Figure 4:
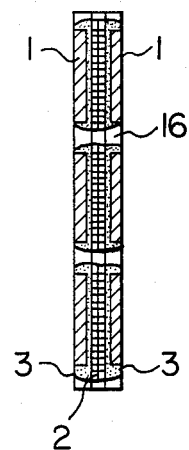
FIG. 4 is a sectional view taken along the line IV—IV in FIG. 3.
Figure 5:
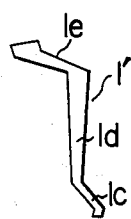
FIG. 5 is a front view of a segment of the armature coil shown in FIGS. 3 and 4.
Figure 6:
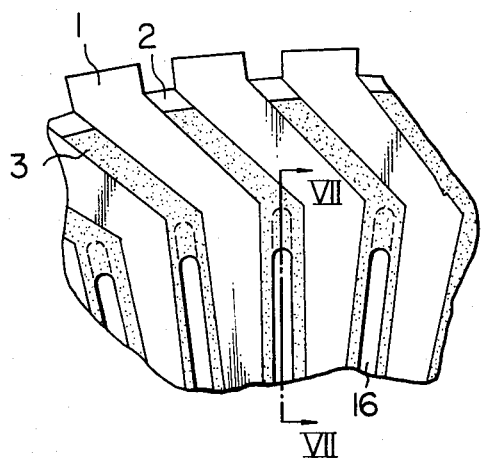
FIG. 6 is a view, on an enlarged scale, of the portion VI in FIG. 3.
Figure 7:
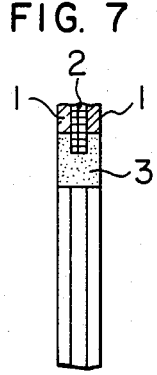
FIG. 7 is a sectional view taken along the line VII—VII in FIG. 6.

Referring to FIG. 3, the insulating plate 2 formed on an insulating material, such as glass cloth, mica plate, etc., which constitutes a base, and the conductive section 1 initimately adhering to the insulating plate 2 at opposite surfaces thereof which constitutes a discoidal coil provide a discoidal coil body. The conductive section 1 is adhesively joined to the insulating plate 2 by means of an adhesive agent 3, such as an adhesive agent of a ceramic material, a heat resisting and insulating resin, etc., and the coil body is formed in the center with an opening for the rotary shaft 6 to extend therethrough. As shown in FIG. 5, the conductive section 1 includes a multiplicity of coil segments 1' of the same shape, arranged substantially radially on opposite surfaces of the insulating plate 2 and connected together at outer and inner peripheral edges 1a and 1b of the segments 1' located on the top and bottom surfaces of the insulating plate 2 in corresponding positions. The insulating plate 2 is formed with a multiplicity of slits 16 arranged substantially radially and each located between the segments 1' of the conductive section 1 arranged substantially radially. As is clearly seen in FIGS. 6 and 7, the adhesive agent 3 not only bonds the conductive section 1 and the insulating plate 2 together but also forms a protective layer on the surface of a portion of the insulating plate 2 interposed between the adjacent coil segments of the conductive section 1 to avoid short-circuiting between them. The adhesive agent 3 is also filled in opposite end portions of each slit 16 formed in the insulating plate 2 to directly connect the top and bottom coil segments together through the adhesive agent 3. By thus providing a bond of high strength between the insulating plate 2 and the top and bottom coil segments of the conductive section 1 located on opposite sides of the insulating plate 2, it is possible to avoid troubles, such as formation of gaps between the parts, short-circuiting due to critical proximity of the parts, buckling of the parts due to heat, etc., which might otherwise occur when differences in temperature or coefficient of thermal expansion of the parts might cause thermal stresses to develop. However, thermal stresses would increase in magnitude if the bond between parts were increased. When prolonged use of the adhesive agent 3 causes its performance to deteriorate, thermal stresses might cause rupture of the coil body to occur. Additionally, heat transfer might be adversely affected when the amount of the adhesive agent 3 used to bond the conductive section 1 and the insulating plate 2 together were too great. However, the aforesaid defects which might occur as a result of providing a bond of high strengths are obviated according to the invention by providing the slits 16 in the insulating plate 2. The slits 16 have the effect of releasing thermal strain from the discoidal coil body to a certain degree, to thereby avoid development of high magnitude stress and provide good ventilation to facilitate transfer of heat.

Figure 8:
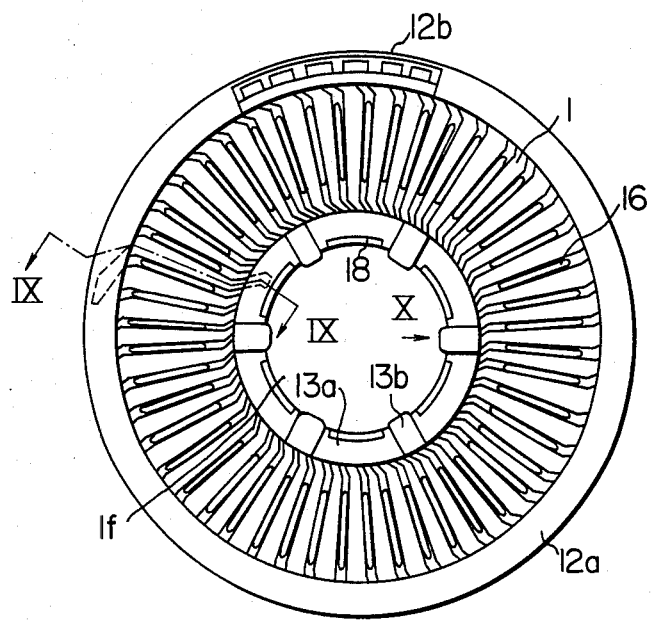
FIG. 8 is a front view of the flat armature coil provided with annular fixing members according to the invention.
Figure 9:
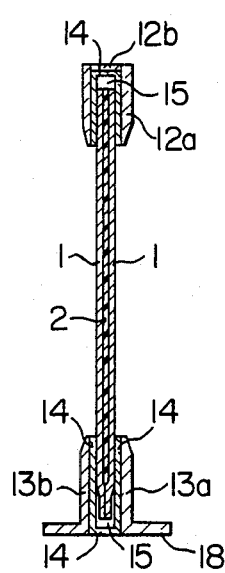
FIG. 9 is a sectional view taken along the line IX—IX in FIG. 8.
Figure 10:
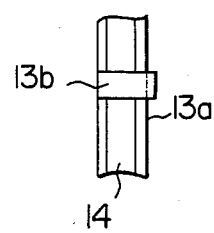
FIG. 10 is a view as seen in the direction of arrow X in FIG. 8.

FIGS. 8-10 show rings 13a, 13b and rings 12a, 12b provided to inner and outer peripheral edges respectively of the discoidal coil body when the coil body is mounted in a rotary electric machine, to further increase the strength with which the rotating body is fabricated and the strength and ease with which the coil body is secured to the housing. As shown in FIGS. 8 and 9, the fixing rings 12a and 12b are clamped against the outer peripheral edge of the coil body 1, 2 with an insulating layer 14 being interposed therebetween, and the rings 12a and 12b are joined to each other by welding. Likewise, the fixing rings 13a and 13b are clamped against the inner peripheral edge of the coil body 1, 2 with the insulating layer 14 being interposed therebetween. The fixing rings 13a and 13b are intermittently caulked as shown in FIG. 10. The fixing rings 13a and 13b are each formed with a fin 18 extending outwardly therefrom at their circumferential surfaces as shown in FIGS. 8 and 9 except the caulked portions. The fins 18 provide heat radiating surfaces which are brought into contact with cooling air currents, subsequently to be described, for releasing the coil heat which is generated therein. The insulating layer 14 is formed of an insulating material of high thermal conductivity, such as a heat resisting synthetic resinous material containing magnesium oxide in fine powder form. As shown in FIG. 9, gaps 15 are formed in the coil body between its inner and outer peripheral edges and the fixing rings 13a, 13b and 12a, 12b respectively or on the radially opposite ends of the coil body. Combined with the use of an insulating material of high resilience for forming the insulating layer 14, the provision of the gaps 15 has the effect of releasing thermal strain of the rotating body and avoiding development of thermal stresses. The fins 18 have been described as being formed at the inner fixing rings 13a and 13b. However, the invention is not limited to this specific position of the fins 18, and the fins 18 may additionally be provided to the insulating layer 14, as well as to the fixing rings 12a and 12b at the outer peripheral edge of the coil body.

The coil body 1, 2 can be cooled with increased efficiency by providing the fins 18 with a shape which would make them advantageously serve as cooling air guides to lead the cooling air currents to an internal air passageway 24 (see FIG. 1) of the coil body 1, 2.

Figure 11:
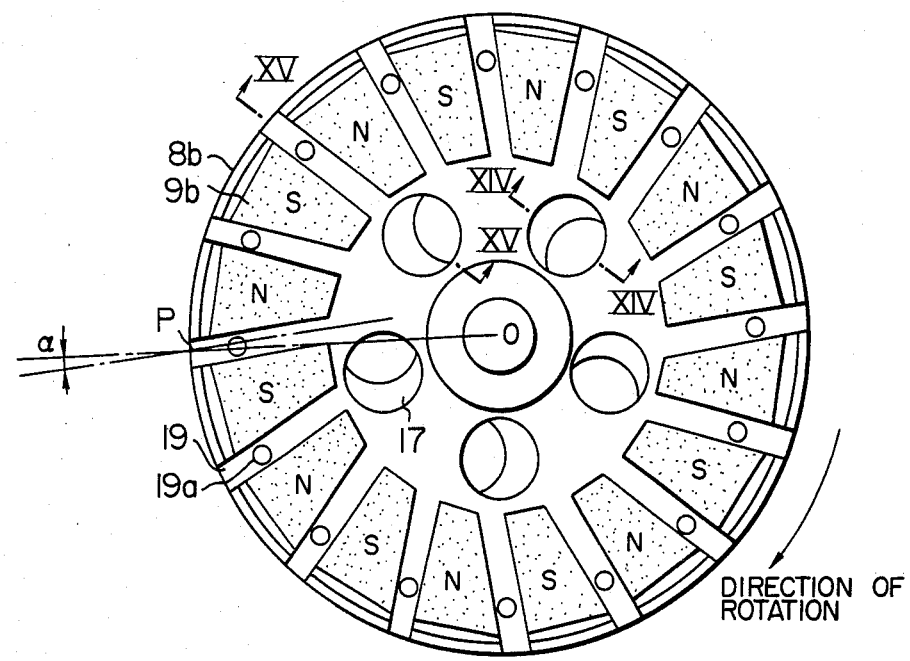
FIG. 11 is a front view of the rotor.
Figure 12:
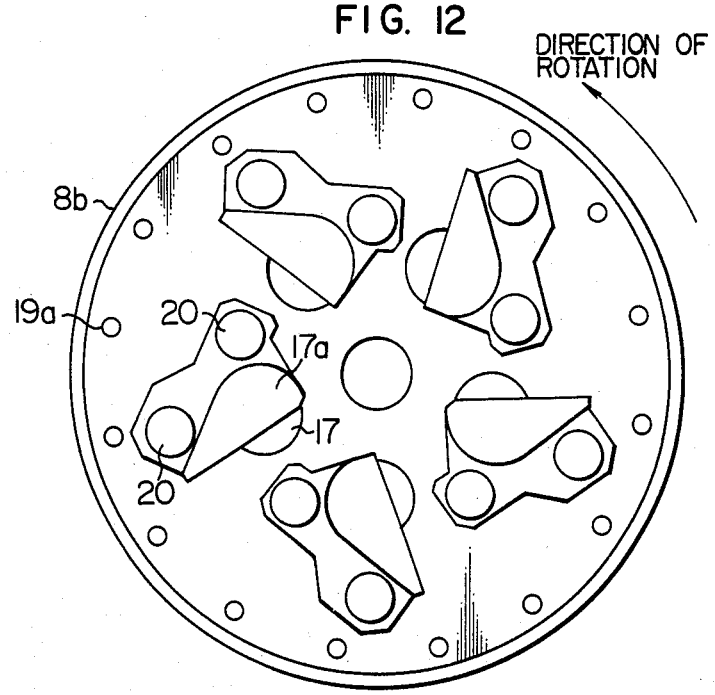
FIG. 12 is a rear view of the rotor.
Figure 13:
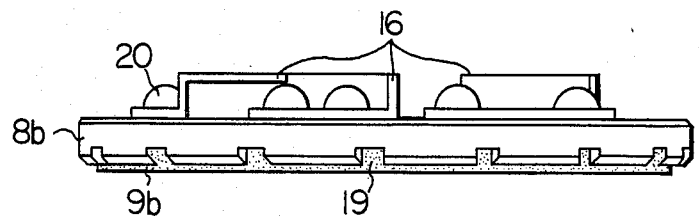
FIG. 13 is a side view of the rotor.
Figure 14:
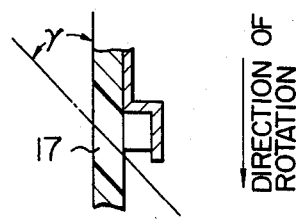
FIG. 14 is a sectional view taken along the line XIV—XIV in FIG. 11.
Figure 15:
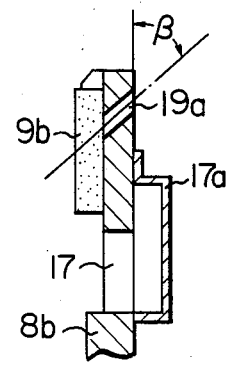
FIG. 15 is a sectional view taken along the line XV—XV in FIG. 11.

FIGS. 11-15 show the construction of the rotor disc 8b having located on a surface thereof facing the armature coil a plurality of permanent magnets 9b of opposite polarities alternately arranged peripherally of the rotor disc 8b, and a plurality of grooves 19, each located between the adjacent permanent magnet as shown in FIGS. 11 and 13. The rotor disc 8b is formed on a surface thereof opposite the surface facing the armature coil with a plurality of air intake scoops 17a bolted thereto as indicated at 20, a plurality of air inlet apertures 17 located in the vicinity of the center of the rotor disc 8b to penetrate it, and a plurality of air outlet apertures 19a located in the outer peripheral portion of the rotor disc 8b to penetrate it. The scoops 17a are each located near the associated one of the air inlet apertures 17 and shaped such that they perform the function of intercepting a portion of air currents flowing at a relative velocity with respect to the rotor and introducing same into the associated air inlet aperture 17. The air inlet apertures 17, grooves 19 and air outlet apertures 19a constitute passageways for the cooling air currents. To allow air to flow through these passageways, in an amount necessary to perform cooling satisfactorily with a minimized loss, would require forces high enough to forcedly circulate the air and a shape of the passageways which is conducive to a minimized loss of air. The pressure of the air that is raised by the scoops 17a and the centrifugal forces produced by the rotary movement of the air caused by the rotary movement of the motor to occur in the grooves 19 would function as such forces for forcedly circulating the air. However, the rotary movement of the air would have the disadvantage of the energy of rotation of the air being lost, so that it would be necessary to cause the air in the grooves 19 to move in a suitable rotary movement. To optimize the rotary movement of the air in the grooves 19, the grooves 19 each have a center line which is displaced in the direction of rotation of the rotor by an angle α with respect to the radius OP of the rotor disc 5 in going from the periphery P of the rotor disc toward the center O thereof. The angle α may vary, depending on the amount of the air that is required and the rpm of the rotor. Generally, however, the angle α is in the range that satisfies the following relation $0° < α < 45°$. As shown in FIGS. 14 and 15, the air inlet apertures 17 and air outlet apertures 19a have center lines which are inclined by angles γ and β respectively with respect to the surface of the rotor disc 8b, to thereby avoid a sudden change in the direction of flow of the air currents for cooling and reduce eddy current loss.

As can be seen in FIG. 1, the other rotor disc 8a located in spaced juxtaposed relation to the rotor disc 8b has substantially the same construction as the rotor disc 8b except that the air inlet apertures 17 are not provided.

In operation, when the generator of the aforesaid construction is driven by rotating the rotor discs 8a and 8b through the pulley 25, air flows in currents through the air suction apertures at the rear surface of the housing member 10b into the generator and is caught by the scoops 17a. The air caught by the scoops 17a has its pressure raised and is led through the air inlet apertures 17 on the rotor disc 8b to a space defined between the rotor discs 8a and 8b in which the armature coil is located, where the air is brought into contact with the fins 18 to cool them. Then the air flows through the grooves 19 on the rotor discs 8a and 8b and is accelerated by centrifugal forces, and flows to the outer periphery of the rotor discs 8a and 8b, from which it is discharged through the air outlet apertures 19a to the surface of the rotor disc 8b opposite its surface, at which the scoops 17a are located. Then the air is discharged through the air exhaust apertures 22 at the rear surface of the housing member 10b and the air exhaust apertures 23a and 23b at the lateral surfaces of the housing members 10a and 10b to outside. While flowing through the aforesaid channels, the air currents impinge on the fins 18 of the fixing rings 13a and 13b, flow along the grooves 19 and are brought into contact with the opposite surfaces of the armature coil to cool them.

Figure 16:
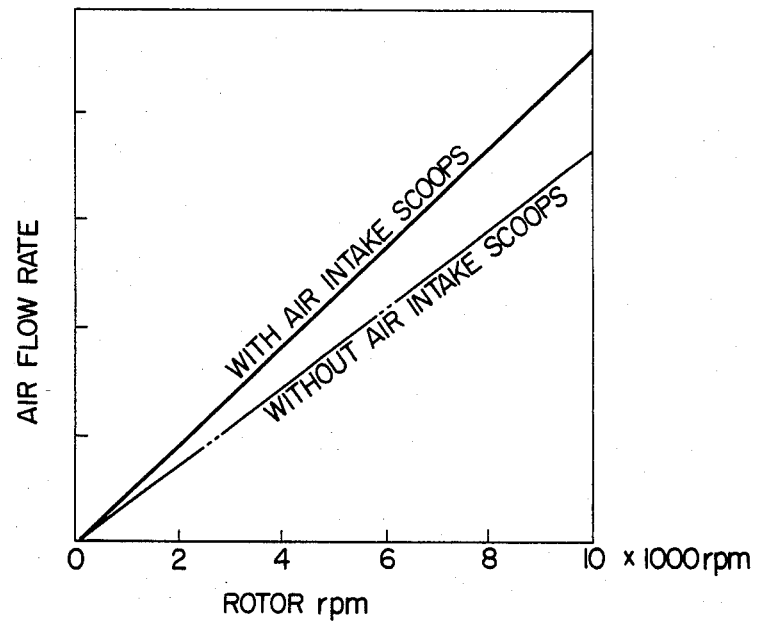
FIG. 16 is a diagrammatic representation of the cooling air flow rate versus rotor rpm characteristic of the electric rotory machine.

FIG. 16 shows the cooling air flow rate versus rotor rpm characteristic of the embodiment of the flat armature coil described above in conformity with the invention, in comparison with the cooling air flow rate versus rotor rpm characteristic of a flat armature coil having no scoops 17a. It will be seen that the provision of the scoops 17a increases the cooling air flow rate by about 20% through the entire rotor rpm range.

In the embodiment shown and described above, one of the two rotor discs has been described as being provided with the air inlet apertures 17. It is to be understood, however, that the invention is not limited to this specific arrangement of the air inlet apertures and that two rotor discs may both be provided with the air inlet apertures 17.

What is claimed is:

1. An electric rotory machine in flat discoidal form as a whole, comprising:
   an armature coil secured to a housing of said electric rotory machine; and
   a rotor rotatably supported in said housing for producing a rotary magnetic field; wherein the improvement resides in that said armature coil comprises:
   a discoidal base formed of insulating material and provided with a multiplicity of substantially radially arranged slits,
   a multiplicity of coil segments located on opposite surfaces of said base and arranged substantially radially between said slits,
   connecting means for connecting said coil segments to said base, said connecting means including inner rings and outer rings located along inner and outer peripheral edges of the base respectively with open spaces left between radially inward ends of said coil segments and said inner rings and between radially outward ends of said coil segments and said outer rings respectively, and with resilient material interposed between said inner and outer rings and said coil segments.

2. An electric rotary machine in flat discoidal form as a whole, comprising:
   an armature coil secured to a housing of said electric rotary machine; and
   a rotor rotatably supported in said housing for producing a rotary magnetic field;
   said rotor including two rotor discs disposed on opposite sides of said armature coil with a spacing interval therebetween and each formed on surfaces thereof with magnets forming pairs on opposite sides of said armature coil, said magnets being arranged peripherally of each rotor disc in such a manner that the magnets of opposite polarities are alternately disposed to reverse the direction of the magnetic field; wherein the improvement resides in that at least one of said two motor discs comprises:
   a plurality of air intake scoops located in the vicinity of the center of rotation of at least one of said two discs on its outer side surface; and
   a plurality of cooling air inlet apertures formed on the disc and penetrating the disc, said cooling air inlet apertures cooperating with said air intake scoops;
   air introduced into said housing of the electric rotary machine, when the motor rotates, being pressurized by said air intake scoops and led through the air inlet apertures to the vicinity of a center of said armature coil to thereby effect cooling thereof; and
   said surfaces of said rotor discs each having said magnets located thereon comprise a plurality of grooves each located between the adjacent two magnets and arranged substantially radially, so that the air introduced into said discs through said air inlet apertures by said air intake scoops for cooling the armature coil flows through said grooves radially outwardly of said rotor discs.

3. An electric rotary machine as claimed in claim 2, wherein said grooves each have a direction which is inclined with respect to the radius of the rotors, to thereby promote flow of the cooling air radially outwardly of the rotors.

4. An electric rotary machine as claimed in claim 2 or 3, wherein said surfaces of said rotor discs each having said grooves are each formed with air outlet apertures located near radially outer ends of said grooves, said air outlet apertures penetrating the disc.

* * * * *